(12) United States Patent
Dai et al.

(10) Patent No.: US 12,478,501 B2
(45) Date of Patent: Nov. 25, 2025

(54) HIGH-BLASTING-VOLUME WATERBORNE POLYURETHANE CONDOM AND PREPARATION METHOD THEREFOR

(71) Applicant: RECKITT BENCKISER HEALTH LIMITED, Berkshire (GB)

(72) Inventors: Jiabing Dai, Gansu (CN); Linlin Feng, Gansu (CN); Bin Liu, Gansu (CN); Liang Chen, Gansu (CN)

(73) Assignee: Reckitt Benckiser Health Limited (GB)

(*) Notice: Subject to any disclaimer, the term of this patent is extended or adjusted under 35 U.S.C. 154(b) by 310 days.

(21) Appl. No.: 18/245,764

(22) PCT Filed: Sep. 16, 2021

(86) PCT No.: PCT/CN2021/118733
§ 371 (c)(1),
(2) Date: Mar. 17, 2023

(87) PCT Pub. No.: WO2022/057856
PCT Pub. Date: Mar. 24, 2022

(65) Prior Publication Data
US 2023/0390104 A1 Dec. 7, 2023

(30) Foreign Application Priority Data
Sep. 21, 2020 (CN) .......................... 202010996806.6

(51) Int. Cl.
*B29C 41/14* (2006.01)
*A61F 6/04* (2006.01)
(Continued)

(52) U.S. Cl.
CPC ................ *A61F 6/04* (2013.01); *B29C 41/14* (2013.01); *B29C 41/46* (2013.01); *B29K 2075/00* (2013.01)

(58) Field of Classification Search
CPC ............ A61F 6/04; B29C 41/14; B29C 41/46
See application file for complete search history.

(56) References Cited

U.S. PATENT DOCUMENTS
2023/0029922 A1  2/2023  Li et al.

FOREIGN PATENT DOCUMENTS
CN  103640133 A  3/2014
CN  103692733 A  4/2014
(Continued)

OTHER PUBLICATIONS

Extended European Search Report dated Sep. 27, 2024, in EP App No. 21868678.0, filed Apr. 6, 2023.
(Continued)

*Primary Examiner* — James Sanders
(74) *Attorney, Agent, or Firm* — Lerner David LLP

(57) ABSTRACT

The present invention provides a waterborne polyurethane condom having a high burst volume and a preparation method thereof. The method comprises the steps of: providing a waterborne polyurethane; dipping into the waterborne polyurethane and then drying, and repeating the process of dipping into the waterborne polyurethane and then drying for N times so as to obtain a waterborne polyurethane film; rolling up an end of the waterborne polyurethane film and then drying; dipping into a releasing agent, followed by drying, mold releasing, and electrical inspection to obtain a waterborne polyurethane condom; wherein N is equal to 1-5, the waterborne polyurethane is an anionic waterborne polyurethane, and the waterborne polyurethane has a 100% tensile modulus of less than or equal to 2.0 Mpa and an elongation at break of greater than or equal to 650%; the polyurethane condom prepared by the method has a burst (Continued)

volume of greater than 12 L, a burst pressure of greater than 1 KPa, and a 100% tensile modulus of less than or equal to 2.0 MPa.

6 Claims, 1 Drawing Sheet

(51) Int. Cl.
  *B29C 41/46* (2006.01)
  *B29K 75/00* (2006.01)

(56) References Cited

FOREIGN PATENT DOCUMENTS

| | | | |
|---|---|---|---|
| CN | 111072902 | A | 4/2020 |
| CN | 111138614 | A | 5/2020 |
| CN | 111138614 | A1 | 5/2020 |
| CN | 111658288 | A | 9/2020 |
| CN | 111743680 | A | 10/2020 |
| CN | 111748110 | A | 10/2020 |
| CN | 112062983 | A | 12/2020 |
| CN | 112079986 | A | 12/2020 |
| EP | 0922553 | A2 | 6/1999 |
| JP | H11245243 | A | 9/1999 |

OTHER PUBLICATIONS

International Search Report and Written Opinion received in corresponding PCT Application No. PCT/CN2021/118733 mailed Nov. 23, 2021.
CNIPO; Office Action dated Jul. 20, 2022 in CN202010996806.6, filed Sep. 21, 2020.

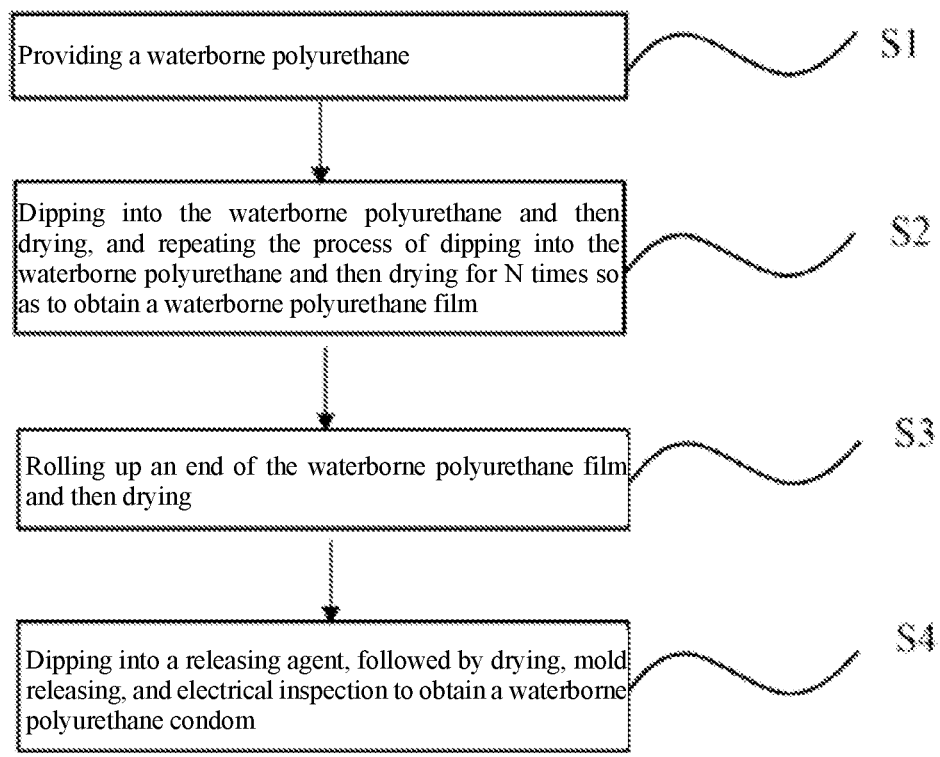

HIGH-BLASTING-VOLUME WATERBORNE POLYURETHANE CONDOM AND PREPARATION METHOD THEREFOR

CROSS-REFERENCE TO RELATED APPLICATIONS

This application is a U.S. National Phase of International Patent Application No. PCT/CN2021/118733, filed on 16 Sep. 2021, which claims priority to Chinese Application Serial No. 202010996806.6 filed 21 Sep. 2020. The entire contents of these applications are incorporated herein by reference in their entirety.

TECHNICAL FIELD

The present invention relates to the technical field of waterborne polyurethane application, and in particular to a waterborne polyurethane condom having a high burst volume and a preparation method thereof.

BACKGROUND

Condom is currently the most widely used and simple device for contraception and prevention of sexually transmitted diseases in the world. Existing products mainly include natural latex rubber condoms and waterborne polyurethane condoms.

Due to the material characteristics of natural latex, it is difficult for natural latex rubber condoms to achieve a thickness of 0.04 mm or less, and meanwhile natural latex contains a variety of proteins, and there will be certain safety risks for people with protein allergies. However, after decades of commercialization, natural latex rubber condoms have a wide market audience, and its soft texture has been accepted by consumers.

At present, polyurethane condoms on the market generally have a high modulus, with a burst volume of about 7-11 L. It has poor softness and burst volume are poor as compared with latex, and therefore developing a waterborne polyurethane condom with low modulus and high elongation, which not only retains the advantages of polyurethane of no protein allergy, high strength, high pressure, and high thermal conductivity but also has the softness and high burst volume close to latex products, and has further improved experience of polyurethane condom products, is of very important market significance.

SUMMARY OF THE INVENTION

In order to solve the technical problems existing in the prior art, the present invention provides a waterborne polyurethane condom having a high burst volume and a preparation method thereof.

First, the present invention provides a waterborne polyurethane condom having a high burst volume and a preparation method thereof, the method comprising at least the steps of: providing a waterborne polyurethane; dipping into the waterborne polyurethane and then drying, and repeating the process of dipping into the waterborne polyurethane and then drying for N times so as to obtain a waterborne polyurethane film; rolling up an end of the waterborne polyurethane film and then drying; dipping into a releasing agent, followed by drying, mold releasing, and electrical inspection to obtain a waterborne polyurethane condom; wherein N is equal to 1-5, the waterborne polyurethane is an anionic waterborne polyurethane, and the waterborne polyurethane has a 100% tensile modulus of less than or equal to 2.0 MPa and an elongation at break of greater than or equal to 650%.

In one embodiment, the drying after rolling up an end of the waterborne polyurethane film is drying for formation, the drying after dipping into the waterborne polyurethane is drying for fixing, and the duration of the drying for fixing and the duration of the drying for formation satisfy $t_{form}=90 \cdot \Phi - 1.8 \cdot (N+2) \cdot t_{fix}$, where $t_{form}$ is the duration of the drying for formation in minutes, $t_{fix}$ is the duration of the drying for fixing in minutes, N is the number of repeated dipping, $\Phi=2.7-0.015 \cdot T$, and T is the temperature of the drying for fixing and the drying for formation in °C.

In one embodiment, the duration of the drying for fixing is 2-10 minutes, the duration of the drying for formation is 10-65 minutes, and the duration of the drying of releasing agent is 2-minutes.

In one embodiment, the temperature of the drying is 80-140° C.

In one embodiment, the solid content of the waterborne polyurethane is 15-30%.

In one embodiment, among the solid raw material components of the waterborne polyurethane, macromolecular polyols account for 60-85% of all solid raw material components, and the proportion of the macromolecular polyols with three or more functionalities is 10-40% in the macromolecular polyols.

In one embodiment, the macromolecular polyols consist of bifunctional macromolecular polyols with a molecular mass of 500 to 4,000 and trifunctional macromolecular polyols with a molecular mass of 650 to 6,000 in a mass ratio of 4:(0.2-1.5).

The present invention also provides a waterborne polyurethane condom prepared by the method as described above.

In one embodiment, the thickness of the waterborne polyurethane condom is 0.02 mm to mm.

In one embodiment, the waterborne polyurethane condom has any one or more of the following characteristics:
a 100% tensile modulus of less than or equal to 2.0 MPa;
a burst volume of greater than or equal to 12 L;
a burst pressure of greater than or equal to 1 KPa;
an elongation at break of greater than or equal to 650%; and
a tensile strength of greater than or equal to 20 MPa.

As described above, the present invention provides a polyurethane condom with low modulus and high burst volume and a preparation method thereof, and has the following beneficial effects: the polyurethane condom with low modulus and high burst volume, obtained in the present invention by using a waterborne polyurethane resin having low modulus and high elongation through a forming process of multiple dipping and drying, can achieve performance indices of a product thickness of 0.02-0.06 mm, 100% tensile modulus of ≤2.0 MPa, a burst volume of ≥12 L, and burst pressure of ≥1 KPa.

BRIEF DESCRIPTION OF DRAWINGS

FIG. 1 shows a schematic flow chart of the preparation method of the present invention.

DETAILED DESCRIPTION OF THE INVENTION

Embodiments of the present invention are described below through specific examples, and those skilled in the art can easily understand other advantages and effects of the present invention from the disclosure in the specification. The present invention can also be carried out or applied through other distinct specific embodiments, and various modifications or changes can be made to the details in the specification based on different viewpoints and applications without departing from the spirit of the present invention. Note that the performance tests of the polyurethane resin and the condom according to the present invention are carried out with reference to national standards GB/T1040.1-2006 and GB7544-2009, respectively. "%" and "part(s)" shown herein mean "% by mass" and "part(s) by mass", respectively, unless specified otherwise.

Reference is made to FIG. 1. First, the present invention provides a method for preparing a waterborne polyurethane condom having a high burst volume, which may be carried out by repetitively dipping into a waterborne polyurethane resin and comprises at least steps S1-S4:

S1: providing a waterborne polyurethane;

S2: dipping into the waterborne polyurethane and then drying, and repeating the process of dipping into the waterborne polyurethane and then drying for N times so as to obtain a waterborne polyurethane film;

S3: rolling up an end of the waterborne polyurethane film and then drying;

S4: dipping into a releasing agent, followed by drying, mold releasing, and electrical inspection to obtain a waterborne polyurethane condom;

wherein N is equal to 1-5, the waterborne polyurethane is an anionic waterborne polyurethane, and the waterborne polyurethane has a 100% tensile modulus of less than or equal to 2.0 MPa and an elongation at break of greater than or equal to 650%.

In step S1, in order to prepare the waterborne polyurethane condom, the present invention provides an anionic waterborne polyurethane with excellent tensile modulus and elongation at break. The 100% tensile modulus of the anionic polyurethane may be less than or equal to 2.0 MPa, such as 1.8 MPa, 1.5 MPa, 1.4 MPa, or 1.3 MPa. The elongation at break of the anionic waterborne polyurethane may be greater than or equal to 650%, such as 720%, 730%, or 750%. The waterborne polyurethane provided by the present invention allows the finally prepared waterborne polyurethane condom to have an excellent performance of a burst volume greater than 12 L. The anionic waterborne polyurethane resin used in the present invention is produced by mature technology and has the advantage of a high molecular weight with the premise of a low modulus. The solid content of the waterborne polyurethane resin may be between 15% and 30%, such as 20%, or 25%. The waterborne polyurethane resin has good leveling within the above solid content range, and the prepared condom has the advantages of little difference in uniformity, large burst volume and few defects.

The waterborne polyurethane of the present invention can be synthesized by a stepwise method. The waterborne polyurethane can be formed by preparing from solid raw materials and dispersing in water. The stepwise method may include processes such as polymerization, chain extension, and emulsification. The solid raw material of the waterborne polyurethane may include a soft segment and a hard segment. The soft segment may be a macromolecular polyol or a composition of macromolecular polyols, and the hard segment may be a polyisocyanate or a composition of polyisocyanates. The macromolecular polyol may include macromolecular diols and macromolecular triols, such as poly(tetramethylene ether glycol) (PTMEG), polypropylene glycol (PPG), and polyoxypropylene triol. Herein, the molecular weight of poly(tetramethylene ether glycol) may be 500-4000, the molecular weight of the polypropylene glycol may be 1000-5000, and the molecular weight of polyoxypropylene triol may be 650-6000.

In one embodiment, the waterborne polyurethane consists of the solid raw material components of (in parts by weight): 23-38 parts of macromolecular diol, 3-5 parts of macromolecular triol, 6.5-10 parts of polyisocyanate, 1.3-1.6 parts of a hydrophilic chain extender, 0.05-0.08 part of a small molecule polyol chain extender, 1-1.3 parts of a neutralizing agent, 0.2-0.3 part of a small molecule amine post-chain extender, and 0.05-0.08 part of a catalyst.

The hydrophilic chain extender may be one or more of dimethylol propionic acid, dimethylol butyric acid, and sodium 2-[(2-aminoethyl)amino]ethanesulphonate; the small molecule polyol chain extender may include any one or more of trimethylol propane, glycerol, butanediol, ethylene glycol and cyclohexanedimethanol; the neutralizing agent may include any one or more of triethylamine and sodium bicarbonate; the small molecule amine post-chain extender is any one or more of ethylenediamine, hexamethylenediamine, isophoronediamine, toluenediamine and diaminodicyclohexylmethane. The polyisocyanate may be any one or more of TDI, MDI, IPDI, HDI, and HMDI.

In one embodiment, the waterborne polyurethane consists of: 8-13 parts of PTMEG, 15-25 parts of PPG, 3-5 parts of polyoxypropylene triol, 5.5-8 parts of IPDI, 1-2 parts of HDI, 1.3-1.6 parts of DMPA and 0.5-0.8 part of DEG, 0.05-0.08 part of a catalyst, 1-1.3 parts of triethylamine, and 0.2-0.3 part of isophoronediamine.

In one embodiment, the macromolecular polyols consist of a bifunctional macromolecular polyol with a molecular mass of 500-4000 and a trifunctional macromolecular polyol with a molecular mass of 650-6000 in a mass ratio of 4:(0.2-1.5). Further, the macromolecular polyols consist of poly(tetramethylene ether glycol) (PTMEG) with a molecular mass of 500-4000, polypropylene glycol (PPG) with a molecular mass of 1000-5000 and polyoxypropylene triol with a molecular mass of 650-6000 in a mass ratio of 1:3:(0.2-1.5).

In the waterborne polyurethane resin, the soft segments may account for 60-85%, for example, 79.5% of all solid raw materials, and the crosslinking ratio of the soft segments may be 10-40%, for example 25%. The crosslinking ratio of soft segments may be defined as the mass ratio of macromolecular polyols with three or more functionalities to all macromolecular polyols.

In step S2, the preparation of the waterborne polyurethane condom further includes a process of repetitively dipping and drying to form a waterborne polyurethane film. For example, it may be achieved by dipping a mold into the waterborne polyurethane and then drying, and repeating N times, wherein the number of repetitions (N) may be 1-5, such as 2 or 3. Through the process of repetitive dipping, the present invention allows the condom to have a good thickness uniformity, less defects, and a large burst volume, which is beneficial for drying without wrinkling or cracking. The waterborne polyurethane of the present invention needs to go through a drying step after each dipping, and the drying after each dipping may be drying for fixing, and the duration of the drying for fixing may be 2-10 minutes.

In step S3, the waterborne polyurethane film can be subjected to further drying after rolling up an end, the drying may be drying for formation, and the duration of the drying for formation may be 10-65 minutes. In steps S2 to S4, the temperature of drying may be 80-140° C., such as 120° C. or 130° C.

In the present invention, the tensile strength of the film formed by dipping into the polyurethane and drying may be tested after each dipping into the polyurethane. For example, when the tensile strength of the film formed by each dipping into the polyurethane and drying reaches 60% of the predetermined tensile strength, the drying can be stopped and next dipping can be carried out. The predetermined tensile strength may be greater than or equal to 20 MPa, for example. In the present invention, the drying is carried out for a certain period of time after each dipping. For example, when the tensile strength of the polyurethane film is tested after the first dipping, and if the tensile strength of the polyurethane film reaches 60% of the predetermined tensile strength, the time used for drying at this time can be the duration of the drying for fixing in the present invention. The duration of the drying for fixing used in the present invention may be greater than or equal to the drying time required for the tensile strength of the polyurethane film formed by the first dipping into the waterborne polyurethane to reach 60% of the predetermined tensile strength. The duration of the drying for formation may satisfy $t_{form}=90 \cdot \Phi - 1.8 \cdot (N+2) \cdot t_{fix}$, where $t_{form}$ is the duration of the drying for formation in minutes, $t_{fix}$ is the duration of the drying for fixing in minutes, N is the number of repeated dipping, $\Phi$ is the temperature effect factor, $\Phi=2.7-0.015 \cdot T$, and T is the temperature of the drying for fixing and the drying for formation in ° C. In one embodiment, when the above equation applies, the temperature of the drying for formation is the same as the temperature of the drying for fixing. By applying the above equation between the duration of the drying for fixing and the duration of the drying for formation, it allows the finally prepared condom to have the best performance, and prevents the final product from being too brittle because the duration of the drying is too long, or having a deficiency of insufficient strength because the duration is too short.

In step S4, the duration of drying after dipping into the releasing agent may be 2-30 minutes.

The present invention also provides a waterborne polyurethane condom with low modulus and high burst volume. The waterborne polyurethane condom may be a thin variety, and its thickness can be between 0.02 mm to 0.06 mm, such as 0.03 mm. The polyurethane condom has good tensile modulus and burst volume. The 100% tensile modulus of the polyurethane condom of the present invention can be less than or equal to 2.0 MPa, such as 1.8 MPa, 1.3 MPa, or 1.4 MPa. The burst volume of the polyurethane condom may be greater than 12 L, such as 15 L, 17 L, 18 L, or 20 L. In one embodiment, the polyurethane condom also has good elongation at break. The elongation at break of the polyurethane condom can be greater than or equal to 650%, such as 720%, or 750%. The burst pressure of the condom can be greater than or equal to 1 KPa, such as 1.3 KPa, or 1.4 KPa. The tensile strength of the polyurethane condom can be greater than or equal to 20 MPa, such as 30 MPa, 31 MPa, 32 MPa, or 33 MPa. Herein, the polyurethane condom can be a male condom. It should be understood that the polyurethane condom can also be made into a female condom, other special-shaped condom and the like.

The present invention will be described in more details with reference to specific examples.

EXAMPLES

Example 1

4.73 kg PTMEG 3000, 9.47 kg PPG3000, and 4.2 kg polyoxypropylene triol having a molecular weight of 5000 were fed into a reactor, 2.92 kg IPDI and 0.75 kg HDI were added thereto, heated to 80-120° C. under stirring, maintained at the temperature and reacted for 1-3 hours. 0.72 kg DMPA, 0.31 kg DEG, 6.5 kg acetone and 0.04 kg of a catalyst were added thereto, and reacted at 70-90° C. for 2-6 hours. Subsequently, the temperature was lowered and triethylamine was added for neutralization, and then water was added for high-speed dispersion and emulsification. Then, 0.15 kg of isophorone diamine was added for post-chain extension, and the solvent was removed under vacuum to obtain a desired waterborne polyurethane resin emulsion. The prepared polyurethane resin was measured to have a 100% tensile modulus of 1.69 MPa, and elongation at break of 811%.

A glass mold was cleaned and the surface of the mold was heated to 30-40° C., and the mold was dipped 5 times into the prepared polyurethane resin; drying for fixing was carried out at 140° C. for 4 minutes after each dipping, and drying for formation was carried out at 140° C. for minutes after rolling up an end thereof. Then, the mold was dipped into a releasing agent, dried at 80° C., and subjected to mold releasing, electrical inspection, inner packaging, and outer packaging to obtain Sample 1. Sample 1 had a thickness of 0.032 mm, a 100% tensile modulus of 1.7 MPa, a burst volume of 18.9 L, elongation at break of 805%, a burst pressure of 2.8 KPa, and a tensile strength of 33 MPa.

Example 2

A glass mold was cleaned and the surface of the mold was heated to 30-40° C., and the mold was dipped 4 times into the polyurethane resin prepared in Example 1; drying for fixing was carried out at 120° C. for 6 minutes after each dipping, and drying for formation was carried out at 120° C. for 27 minutes after rolling up an end thereof. Then, it was dipped into a releasing agent, dried at and subjected to mold releasing, electrical inspection, inner packaging, and outer packaging to obtain Sample 2. Sample 2 had a thickness of 0.038 mm, a 100% tensile modulus of 1.69 MPa, a burst volume of 19.5 L, elongation at break of 812%, a burst pressure of 3.7 KPa, and a tensile strength of 32 MPa.

Example 3

A glass mold was cleaned and the surface of the mold was heated to 30-40° C., and the mold was dipped 3 times into the polyurethane resin prepared in Example 1; drying for fixing was carried out at 80° C. for 10 minutes after each dipping, and drying for formation was carried out at 80° C. for 63 minutes after rolling up an end thereof. Then, it was dipped into a releasing agent, dried at and subjected to mold releasing, electrical inspection, inner packaging, and outer packaging to obtain Sample 3. Sample 3 had a thickness of 0.026 mm, a 100% tensile modulus of 1.67 MPa, a burst volume of 18.2 L, elongation at break of 801%, a burst pressure of 2.0 KPa, and a tensile strength of 30 MPa.

Comparative Example 1

The preparation conditions of Comparative Example 1 were the same as those of Example 2, except that the duration of the drying for formation of Sample 2 in Example 2 was changed to 37 minutes to obtain Comparative Sample 1. Comparative Sample 1 had a product thickness of mm, a 100% tensile modulus of 1.9 MPa, a burst volume of 15.4 L, elongation at break of 721%, a burst pressure of 2 KPa, and a tensile strength of 25 MPa.

Comparative Example 2

The preparation conditions of Comparative Example 2 were the same as those of Example 2, except that the duration of the drying for formation of Sample 2 in Example 2 was changed to 32 minutes to obtain Comparative Sample 2. Comparative Sample 2 had a product thickness of mm, a 100% tensile modulus of 1.79 MPa, a burst volume of 16.2 L, elongation at break of 761%, a burst pressure of 2.4 KPa, and a tensile strength of 26.5 MPa.

Comparative Example 3

The preparation conditions of Comparative Example 3 were the same as those of Example 2, except that the duration of the drying for formation of Sample 2 in Example 2 was changed to 22 minutes to obtain Comparative Sample 3. Comparative Sample 3 had a product thickness of 0.038 mm, a 100% tensile modulus of 1.54 MPa, a burst volume of 21.2 L, elongation at break of 856%, a burst pressure of 2.6 KPa, and a tensile strength of 27.3 MPa.

Comparative Example 4

The preparation conditions of Comparative Example 4 were the same as those of Example 2, except that the duration of the drying for formation of Sample 2 in Example 2 was changed to 17 minutes to obtain Comparative Sample 4. Comparative Sample 4 had a product thickness of mm, a 100% tensile modulus of 1.3 MPa, a burst volume of 24 L, elongation at break of 921%, a burst pressure of 1.6 KPa, and a tensile strength of 23.1 MPa.

Therefore, the present invention has effectively overcome various deficiency in the prior art and is highly valuable in industrial application. The above examples only illustrate the principles and effects of the present invention, but are not intended to limit the present invention. Anyone skilled in the art can modify or change the above examples without departing from the spirit and scope of the present invention. Therefore, all equivalent modifications or changes made by those skilled in the art without departing from the spirit and technical ideas disclosed in the present invention shall be encompassed by the claims of the present invention.

The invention claimed is:

1. A method for preparing a waterborne polyurethane condom having a high burst volume, characterized in that the method comprises at least the steps of:
   providing a waterborne polyurethane;
   dipping into the waterborne polyurethane and then drying, and repeating the process of dipping into the waterborne polyurethane and then drying N times so as to obtain a waterborne polyurethane film;
   rolling up an end of the waterborne polyurethane film and then drying;
   dipping into a releasing agent, followed by drying, mold releasing, and electrical inspection, to obtain a waterborne polyurethane condom;
   wherein N is equal to 1-5, the waterborne polyurethane is an anionic waterborne polyurethane, and the waterborne polyurethane has a 100% tensile modulus of less than or equal to 2.0 MPa and an elongation at break of greater than or equal to 650%; and
   wherein the drying after rolling up an end of the waterborne polyurethane film is drying for formation, the drying after dipping into the waterborne polyurethane is drying for fixing, and the duration of the drying for fixing and the duration of the drying for formation satisfy $t_{form}=90 \cdot \Phi - 8 \cdot (N+2) \cdot t_{fix}$, where $t_{form}$ is the duration of the drying for formation in minutes, $t_{fix}$ is the duration of the drying for fixing in minutes, N is the number of repeated dipping, $\Phi=2.7-0.015 \cdot T$, and T is the temperature of the drying for fixing and the drying for formation in ° C.

2. The method according to claim 1, wherein the duration of the drying for fixing is 2-10 minutes, the duration of the drying for formation is 10-65 minutes, and the duration of the drying of the releasing agent is 2-30 minutes.

3. The method according to claim 1, wherein the temperature of the drying is 80-140° C.

4. The method according to claim 1, wherein a solid content of the waterborne polyurethane is 15-30 wt %.

5. The method according to claim 1, wherein among solid raw material components of the waterborne polyurethane, macromolecular polyols account for 60-85 wt % of all solid raw material components, and the proportion of macromolecular polyols with three or more functionalities is 10-40 wt % in the macromolecular polyols.

6. The method according to claim 5, wherein the macromolecular polyols consist of bifunctional macromolecular polyols with a molecular mass of 500 to 4,000 and trifunctional macromolecular polyols with a molecular mass of 650 to 6,000 in a mass ratio of 4: (0.2-1.5).

* * * * *